United States Patent
Shichijo et al.

(10) Patent No.: US 7,417,355 B2
(45) Date of Patent: *Aug. 26, 2008

(54) VEHICULAR TANDEM TYPE ROTARY ELECTRIC MACHINE

(75) Inventors: Akiya Shichijo, Yatomi (JP); Shin Kusase, Oobu (JP)

(73) Assignee: Denso Corporation, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/485,527

(22) Filed: Jul. 13, 2006

(65) Prior Publication Data

US 2007/0013261 A1 Jan. 18, 2007

(30) Foreign Application Priority Data

Jul. 15, 2005 (JP) .............................. 2005-206906

(51) Int. Cl.
H02K 19/34 (2006.01)

(52) U.S. Cl. ....................... 310/263; 310/114

(58) Field of Classification Search ................. 310/114, 310/263

See application file for complete search history.

(56) References Cited

U.S. PATENT DOCUMENTS

| | | | | |
|---|---|---|---|---|
| 4,980,595 | A | * | 12/1990 | Arora .......................... 310/263 |
| 5,177,388 | A | | 1/1993 | Hotta et al. |
| 5,233,249 | A | | 8/1993 | Schaeftlmeier et al. |
| 5,270,604 | A | | 12/1993 | Sandel et al. |
| 6,476,530 | B1 | | 11/2002 | Nakamura et al. |
| 6,703,750 | B2 | | 3/2004 | Nakamura |
| 6,707,211 | B2 | | 3/2004 | Oohashi et al. |
| 6,825,589 | B2 | | 11/2004 | Kouda et al. |
| 6,833,648 | B2 | | 12/2004 | Gorohata et al. |
| 6,910,257 | B1 | | 6/2005 | Gorohata et al. |
| 6,943,477 | B1 | | 9/2005 | Nakamura |
| 6,979,926 | B2 | | 12/2005 | Ogawa et al. |
| 6,995,492 | B1 | | 2/2006 | Kouda et al. |
| 2003/0233748 | A1 | | 12/2003 | Gorohata et al. |
| 2004/0117975 | A1 | | 6/2004 | Nakamura |
| 2006/0033394 | A1 | | 2/2006 | Ogawa et al. |
| 2006/0220477 | A1 | * | 10/2006 | Okumoto et al. ............... 310/58 |

FOREIGN PATENT DOCUMENTS

| | | | |
|---|---|---|---|
| JP | A 1-157251 | | 6/1989 |
| JP | A 4-029547 | | 1/1992 |
| JP | A 4-197065 | | 7/1992 |
| JP | A 5-500300 | | 1/1993 |
| JP | 05-083906 | * | 4/1993 |
| JP | A 5-083905 | | 4/1993 |
| JP | A 5-137295 | | 6/1993 |
| JP | A 5-308751 | | 11/1993 |

(Continued)

*Primary Examiner*—Burton Mullins
(74) *Attorney, Agent, or Firm*—Oliff & Berridge, PLC

(57) ABSTRACT

A vehicular tandem type rotary electric machine is disclosed having first and second stator cores 23, 33 having first and second circumferentially spaced slots to accommodate therein first and second stator coils 24, 34, respectively, and first and second Lundell type rotor cores 21, 31 supported on a common rotary shaft 4 in an axially adjacent relationship to be rotatable within the first and second stator cores, respectively, on which first and second field coils 22, 32 are wounded, respectively. Both of the first and second stator coils 24, 34 comprise segments-sequentially-joined stator coils, respectively, each of which includes segment conductors.

5 Claims, 6 Drawing Sheets

FOREIGN PATENT DOCUMENTS

| | | |
|---|---|---|
| JP | A 6-022518 | 1/1994 |
| JP | A 11-098789 | 4/1999 |
| JP | A 2000-299949 | 10/2000 |
| JP | A 2001-314054 | 11/2001 |
| JP | A 2003-32933 | 1/2003 |
| JP | A 2004-032882 | 1/2004 |
| JP | A 2004-032884 | 1/2004 |
| JP | A 2004-032890 | 1/2004 |
| JP | A 2004-032987 | 1/2004 |
| JP | A 2004-048939 | 2/2004 |
| JP | A 2004-048941 | 2/2004 |
| JP | A 2004-048967 | 2/2004 |
| JP | A 2004-064914 | 2/2004 |
| JP | A 2004-166406 | 6/2004 |
| JP | A 2005-117843 | 4/2005 |

* cited by examiner

NEUTRAL POINT

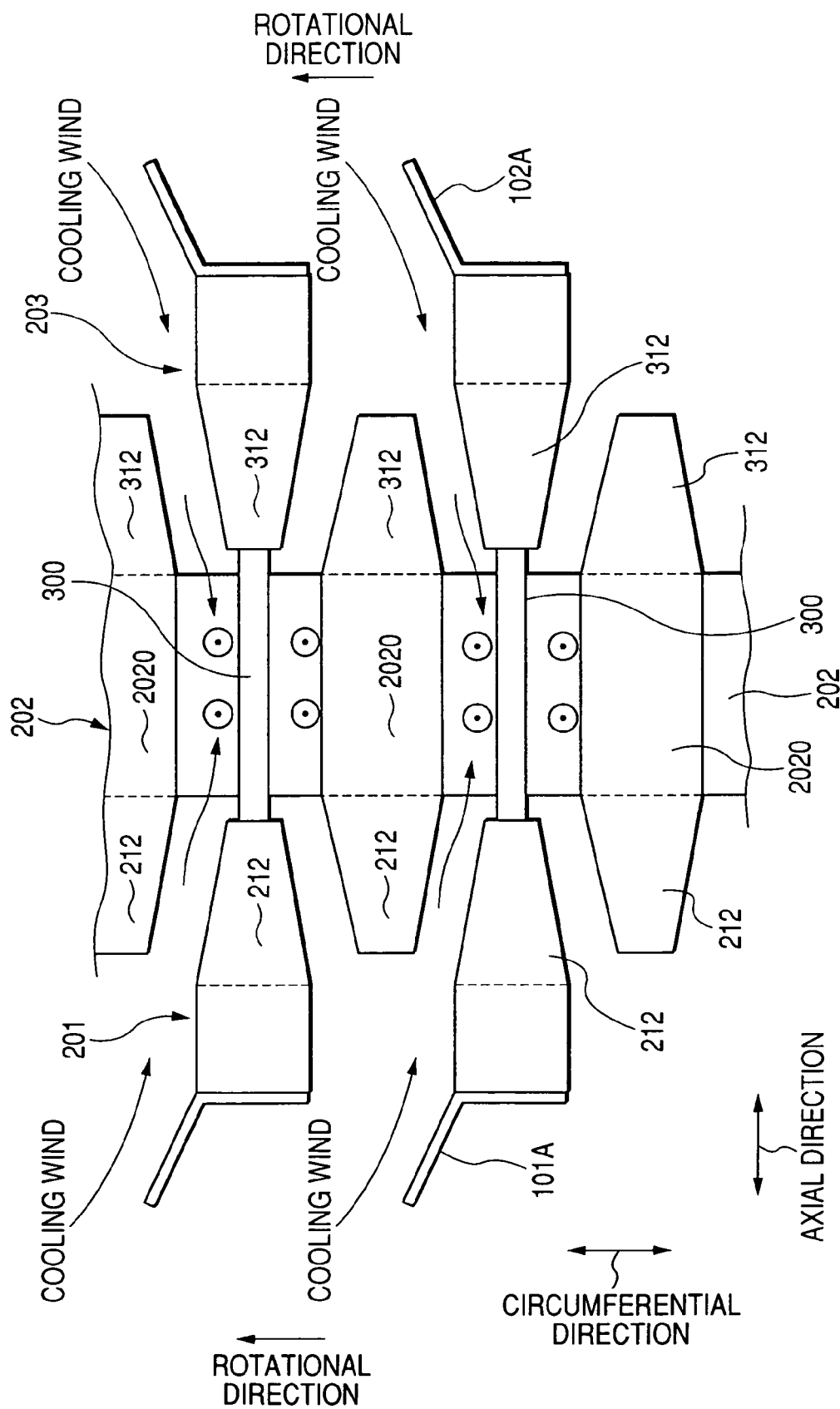

VEHICULAR TANDEM TYPE ROTARY ELECTRIC MACHINE

CROSS REFERENCE TO RELATED APPLICATIONS

This application is related to Japanese Patent Application No. 2005-206906 filed on Jul. 15, 2005, the contents of which are hereby incorporated by reference.

BACKGROUND OF THE INVENTION

1. Technical Field of the Invention

The present invention relates to electric rotary machines and, more particularly, to a vehicular tandem type rotary electric machine having a single rotary shaft and plural stator rotor pairs.

2. Description of the Related Art

Attempts have heretofore been made to provide rotary electric machines (hereinafter referred to as vehicular tandem type rotary electric machines) each of which includes two Lundell type rotors coupled in tandem for a doubled power output as disclosed in Japanese Patent Laid-Open Publication Nos. 1-157251, 5-137295, 5-308751, 5-500300, 6-22518, 11-98789 and 2005-117843. With these tandem type rotary electric machines, the rotary electric machines can be manufactured in a compact structure arranged to provide two output voltages at different levels independently controllable from each other. Stated another way, in contrast to a structure in which two rotary electric machines are individually installed, the tandem type rotary electric machine can remarkably reduce production cost and installation space. The possibility of individually controlling the two output voltages is particularly useful for a two-voltage type rotary electric machine that is operative to separately provide a high output voltage of, for instance, 42V in addition to a low output voltage of 12V.

Further, another attempt has heretofore been made by the same applicant as that of the present application to provide tandem type rotary electric machines each arranged to include a segments-sequentially-joined stator coil composed of U-shaped segment conductors inserted to a slot formed in a stator core as disclosed in Japanese Patent Laid-Open Publication Nos. 2004-048939, 2004-048941, 2004-064914, 2004-048967, 2004-032987, 2004-032882, 2004-032884 and 2004-032890.

With the tandem type rotary electric machines incorporating a plurality of Lundell type rotor cores disposed in an axial direction, an issue arises with a remarkable increase in an axial length in comparison to that of a commonly used vehicular alternator employing a Lundell type rotor core.

Such an increase in the axial length of the rotary electric machine leads to an increase in the occurrence of deflection of a rotary shaft in a radial direction thereof. This results in a need to increase an electromagnetic gap between the stator core and the rotor core in a radial direction thereof. However, Such an increase in the electromagnetic gap in the radial direction reflects an increase in magnetic flux reluctance of a magnetic flux circuit with the resultant drop in performance of the rotary electric machine. Further, the increase in the axial length of the rotary electric machine also causes an increase in a rotating mass and a need arises for the rotary shaft to be largely sized in diameter and for bearings and housing to be designed in increased strength with a view to minimizing vibrations of relevant component parts. This results in the occurrence of an issue with an increase in an overall weight of the rotary electric machine.

Consideration has been taken that the increased axial length of the tandem type rotary electric machine provides an insoluble issue inevitably caused in the tandem type rotary electric machine of the related art needed to array the two stator-rotor pairs in the axial direction. Therefore, such a factor reflects a major cause for the tandem type rotary electric machine not to be widely spread in the related art regardless of various advantages.

SUMMARY OF THE INVENTION

The present invention has been completed with a view to addressing the above issues and has an object to provide a vehicular Lundell type rotary electric machine that can achieve a remarkable reduction in size of an overall structure, that is, an axial length in contrast to that of the related art.

To achieve the above object, a first aspect of the present invention provides a vehicular tandem type rotary electric machine driven by an on-vehicle engine, which comprises a first stator rotor pair including a first stator core having slots carrying therein a first stator coil and a first Lundell type rotor core carrying thereon a first field coil, a second stator rotor pair including a second stator core slots carrying therein a second stator coil and a second Lundell type rotor core carrying thereon a second field coil, first and second rectifiers operative to rectify output voltages of the stator coils of the first and second stator rotor pairs, respectively and a controller providing controlled field currents to the first ad second field coils, respectively. The first and second Lundell type rotor cores are supported on a common rotary shaft in an axially adjacent relationship for rotating capability within the first and second stator cores, respectively. The first and second stator coils comprise segments-sequentially-joined stator coils, respectively, each of which includes segment conductors inserted to the slots of each stator core from one side in an axial direction and having ends that are sequentially connected.

With the vehicular tandem type rotary electric machine according to the first aspect of the present invention, both of the first and second stator coils of the first and second stator rotor pairs are comprised of the segments-sequentially-joined stator coils, respectively, each of which includes the segment conductors inserted to the slots of each stator core from one side in the axial direction and having the ends that are sequentially connected.

More particularly, the present inventors have taken notice of a scheme wherein forming all of the stator coils of the segments-sequentially-joined stator coils enables remarkable reduction in an axial length of the axially protruding coil end of the stator coil in comparison to that of the stator coil of a commonly used wiring method. That is, applying the segments-sequentially-joined stator coils, available to shorten the axial length of the coil end, to a tandem type rotary electric machine having a coil end with an axial length two times greater than that of a coil end of a tandem type rotary electric machine of the related art enables a reduction in an axial gap between the two stator rotor pairs of the tandem type rotary electric machine. This allows reduction in the axial length of the tandem type rotary electric machine without causing a drop in power outputs for thereby achieving the suppression of an increase in a rotational mass and a deflection of a rotary shaft. As a result, no need arises for increasing a radial electromagnetic gap between the stator core and the rotor core, enabling reduction in excitation current to be supplied to the rotary machine. Also, the reduction of rotational mass reflects the suppressions of an increase in diameter of the rotary shaft and increases in strength of bearings and housing, resulting in reductions in an overall frame and weight while achieving a lightweight.

With the tandem type rotary electric of a preferred embodiment, the segments-sequentially-joined stator coils of the first and second stator coils may be formed in segments-sequentially-joined stator coil structures, respectively, each of which includes only coil portions occupied in radially adjacent first and second conductor receiving positions in each slot. With such a structure, among various segments-sequentially-joined stator coil structures, the segments-sequentially-joined stator coil structure, enabling the coil end to have the shortest axially protruding length, is employed, making it possible to achieve a further reduction in the axial length of the coil end.

With the vehicular tandem type rotary electric machine of the preferred embodiment, the first stator coil may include coil ends, axially facing the second stator coil and having axially extreme protruding portions, and the second stator coil may include coil ends, axially facing the first stator coil and having axially extreme protruding portions, wherein the axially extreme protruding portions of the coil ends of the first and second stator coils are deviated with a given pitch in the circumferential direction. That is, the segments-sequentially-joined stator coils have coil ends that have axially extreme distal ends arranged in convexo-concave patterns in the axial direction with a fixed circumferential pitch. Accordingly, locating the axially extreme distal ends of the coil ends, axially facing each other, to mate each other in the axial direction enables a reduction in an axial gap between both of the stator cores while enhancing a clearance between the axially facing coil ends.

With the vehicular tandem type rotary electric machine set forth above, the first field coil may have an axial center position deviated from an axial center position of the first stator core to be closer to the second stator rotor pair and/or the second field coil has an axial center position deviated from an axial center position of the second stator core to be closer to the first stator rotor pair. That is, such an arrangement enables the pair of rotor cores to be placed in axially deviated positions so as to be close to each other. This results in capability of locating the centrifugal cooling fans in radiated areas directly below the pair of coil ends axially extending outward from the pair of stator cores without causing a reduction in the amount of field magnetic fluxes. Therefore, the stator coils can be favorably cooled and the tandem type rotary electric machine can have a shortened axial length.

With the vehicular tandem type rotary electric machine, the first Lundell type rotor core of the first stator rotor pair may include first and second half cores held in axially abutting engagement with each other and having claw portions with different magnetic polarities, and the second Lundell type rotor core of the second stator rotor pair includes third and fourth half cores held in axially abutting engagement with each other and having claw portions with different magnetic polarities. The second and third half cores are axially held in tight contact with each other. With such a structure, the magnetic fluxes can be admitted to flow from the claw portions of the second half core to the claw portions of the third half core. This makes it possible to achieve reductions in axial widths of the claw portions of the second and third half cores extending from the respective boss portions, providing capability of achieving reductions in a rotational mass and an axial length of the rotor core.

With the vehicular tandem type rotary electric machine, the first Lundell type rotor core of the first stator rotor pair may include first and second half cores held in axially abutting engagement with each other and having claw portions with different magnetic polarities, and the second Lundell type rotor core of the second stator rotor pair may include third and fourth half cores held in axially abutting engagement with each other and having claw portions with different magnetic polarities. The second and third half cores are integrally formed with each other into a single piece of soft magnetic core member. Such an arrangement provides capability of realizing a tandem type rotary electric machine, which would need to incorporate four half cores in the related art structure, with the use of three half cores. This enables the realization of reduction in magnetic flux reluctance and reduction in the number of component parts.

With the vehicular tandem type rotary electric machine, the second and third half cores may have boss portions carried on the common shaft and having first and second claw portions extending radially outward from outer peripheries of the boss portions and then extending in axially opposite directions. Such an arrangement allows the second and third half cores to have the claw portions placed in contact with each other or to be integrally placed in the substantially and circumferentially same positions in an area radially inward of the axial gap between the stator cores. With such a structure, the claw portions of the second and third half cores can efficiently generate a centrifugal cooling wind, enabling the pair of coil ends to be efficiently cooled.

A second aspect of the present invention provides a vehicular tandem type rotary electric machine driven by an on-vehicle engine, which comprises a first stator rotor pair including a first stator core having slots carrying therein a first stator coil and a first Lundell type rotor core carrying thereon a first field coil and supported on a common rotary shaft to be rotatable within the first stator core, a second stator rotor pair including a second stator core slots carrying therein a second stator coil and a second Lundell type rotor core carrying thereon a second field coil and supported on the common rotary shaft to be rotatable within the second stator core, first and second rectifiers operative to rectify output voltages of the stator coils of the first and second stator rotor pairs, respectively, a controller providing controlled field currents to the first ad second field coils, respectively, and a plurality of axially extending is centrifugal cooling fins made of non-magnetic material and disposed in circumferential gaps each between one claw portion pair and another claw portion pair circumferentially spaced from the one claw portion pair with a given pitch for generating centrifugal cooling winds. With such a structure, the claw portions of the second and third half cores are arranged to allow centrifugal fins, made of non-magnetic material, to be formed in the gaps between the claw portions placed with the given pitch in the circumferential direction. Thus, the claw portions of the second and third half cores can efficiently cool the pair of coil ends present in the axial gap between the stator cores.

Also, the non-magnetic centrifugal fin may have both ends supported with the distal end of the claw portion of the first half core and the distal end of the claw portion of the fourth half core. In another alternative, the non-magnetic centrifugal fin may be fixedly secured to the second or third half core.

A third aspect of the present invention provides a vehicular tandem type rotary electric machine driven by an on-vehicle engine, which comprises a first stator rotor pair including a first stator core having slots carrying therein a first stator coil and a first Lundell type rotor core carrying thereon a first field coil and supported on a common rotary shaft to be rotatable within the first stator core, a second stator rotor pair including a second stator core slots carrying therein a second stator coil and a second Lundell type rotor core carrying thereon a second field coil and supported on the common rotary shaft to be rotatable within the second stator core, first and second rectifiers operative to rectify output voltages of the stator coils of the first and second stator rotor pairs, respectively, a first cooling fan fixedly secured to an outside end face of the first rotor core to create a cooling wind in a centrifugal direction, and a second cooling fan fixedly secured to an outside end face of the second rotor core to create a cooling wind in a centrifugal direction. The first and second cooling fans generate the cooling winds in axially inward directions, respectively.

With such a vehicular tandem type rotary electric machine, the first cooling fan fixedly secured to the front end face of the front rotor core is formed in shape to generate a cooling wind in an axially rearward direction and the second cooling fan fixedly secured to the rear end face of the rear rotor core is formed in shape to generate a cooling wind in an axially forward direction. Such an arrangement enables the cooling wind to flow in the axially rearward direction via the gap between the claw portions of the front rotor core and another cooling wind to flow in the axially forward direction via the gap between the claw portions of the rear rotor core. This enables the cooling wind to effectively cool the pair of coil ends disposed in the axial gap between the pair of stator cores.

BRIEF DESCRIPTION OF THE DRAWINGS

In the accompanying drawings:

FIG. 6 is a deployment view of a typical section showing a layout of rotor cores shown in FIG. 2.

DETAILED DESCRIPTION OF PREFERRED EMBODIMENTS

Various embodiments of vehicular tandem type rotary electric machines according to the present invention are described below in detail with reference to the accompanying drawings. However, the present invention is construed not to be limited to these embodiments described below and a technical concept of the present invention may be implemented in combination with other known technologies or the other technology having functions equivalent to such known technologies.

First Embodiment

Description of Overall Structure

Figure 1:
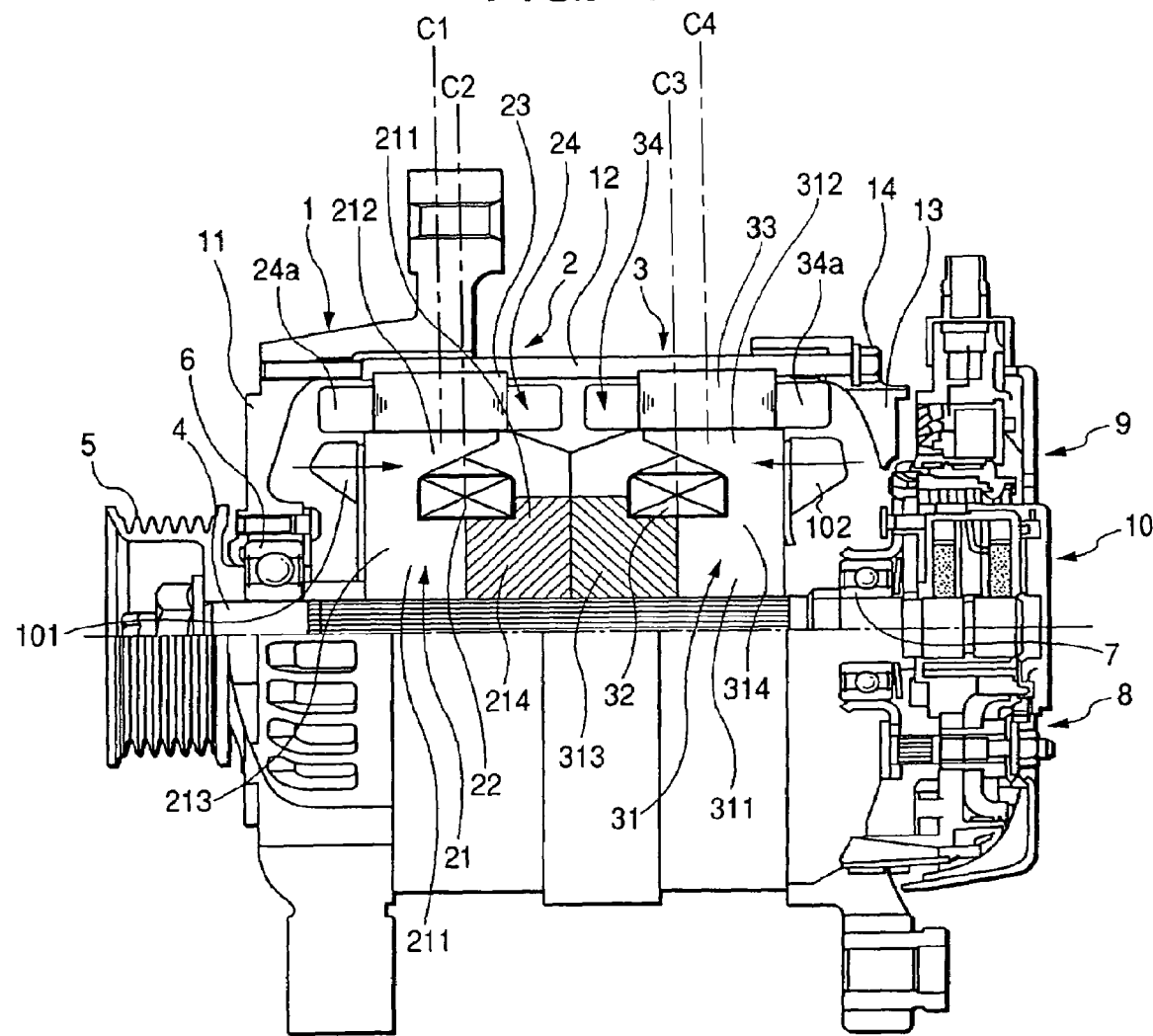
FIG. 1 is an axial sectional view of a vehicular Lundell type rotary electric machine having a Lundell type rotor core of a first embodiment according to the present invention.

First, referring to FIG. 1, there is shown an overall structure of a vehicular tandem type rotary electric machine of a first embodiment according to the present invention. The vehicular tandem type rotary electric machine 1 is comprised of a housing 1, first and second rotary electric machine sections (playing roles as first and second stator rotor cores) 2, 3 supported on a common rotary shaft 4, front and rear bearings 6, 7 mounted on the housing 1 on front and rear sides thereof, a pulley 5 driven by an engine (not shown), rectifiers 8 mounted on the housing 1 on a rear side thereof, a regulator 9 associated with the rectifiers 8, and a slip ring power supply mechanism 10.

The housing 1 is comprised of a front housing 11, a center housing 12 and a rear housing 13, all of which are coupled together by means of through-bolts 14. The housing 1 has the front and rear bearings 6, 7 by which the rotary shaft 4 is rotatably supported. The pulley 5 is fixedly secured to the rotary shaft 4 at an axially extending front end thereof. The rectifiers 8, the regulator 9 and the slip ring power supply mechanism 10 are fixedly mounted on the rear housing 13 at a rear side of the second rotary electric machine section 3.

The first rotary electric machine section 2, playing a role as the first stator rotor pair, includes a Lundell-type rotor core 21, a field coil 22 wound on the Lundell-type rotor core 21, a stator core 23 within which the Lundell-type rotor core 21 is disposed radially inward, and a stator coil 24 wound on the stator core 23. The Lundell-type rotor core 21 is comprised of boss portions 211, a pair of half cores 213, 214 radially extending outward from outer peripheries of the boss portions 211 and having axially extending claw portions that are alternately placed in equidistantly spaced relationship along a circumferential periphery of the rotor core 21, and the field coil 22 wound on the boss portions 211. The stator core 23 is sandwiched between the front housing 11 and the center housing 12 and carries thereon stator windings 24.

Likewise, the second rotary electric machine section 3, playing a role as the second stator rotor pair, includes a Lundell-type rotor core 31, a field coil 32 wound on the Lundell-type rotor core 31, a stator core 33 within which the Lundell-type rotor core 31 is disposed radially inward, and a stator coil 34 wound on the stator core 33. The Lundell-type rotor core 31 is comprised of boss portions 311, a pair of half cores 313, 314 radially extending outward from outer peripheries of the boss portions 311 and having axially extending claw portions that are alternately placed in equidistantly spaced relationship along a circumferential periphery of the rotor core 32, and the field coil 32 wound on the boss portions 311. The stator core 33 is sandwiched between the center housing 12 and the rear housing 13 and carries thereon the stator coil 34. The first and second rotary electric machine sections 2, 3 mentioned above constitute a rotary electric machine having typical Lundell-type rotor cores and are similar in other structure as a commonly used Lundell-type rotary electric machine. Thus, no additional description of the same components is herein omitted for the sake of simplification.

Accordingly, the rotor cores of the tandem type rotary electric machine include a total of four half cores 213, 214, 313, 314 that are axially disposed on the common rotary shaft 4. With the present embodiment, the half cores 214, 313 are placed in is abutting engagement with each other with no clearance between these half cores 214, 313.

Description of Magnetic Field Circuit

The slip ring power supply mechanism 10 is comprised of a pair of slip rings with which a pair of brushes is individually held in contact. One of the slip rings is electrically connected to a negative terminal of a battery and the other one is connected to a positive terminal of the battery to be supplied with electric power. Each of the Lundell type rotor cores 21, 31 carries thereon a pair of field current control transistors that are turned on and off in controlled duty cycles. The regulator 9 is arranged to control duty cycles of drive pulses applied to field current control transistors and plays a role as a controller for providing controlled field currents to the field coils 22, 32.

As an engine (not shown) starts up to drivably rotate the rotor cores 21, 31 by means of the pulley 5 via a belt (not shown), the stator coils 24, 34 generate D.C. currents at given rates, respectively.

Description of Stator Coils 24, 34

The rectifiers 8 include a pair of three-phase full-wave rectifiers. The stator coil 24 has three-phase windings U, V, W arranged in three-phase star connection to output a three-phase A.C. voltage on a first three-phase full-wave rectifier of the rectifiers 8. The first three-phase full-wave rectifier performs three-phase rectification of the three-phase voltage to output a low voltage D.C. power to external loads operating at a low voltage. Likewise, the stator coil 34 has three-phase windings U', V', W' arranged in three-phase star connection to output a three-phase A.C. voltage on a second three-phase full-wave rectifier of the rectifiers 8. The second three-phase full-wave rectifier performs three-phase rectification of the three-phase voltage to output a high voltage D.C. power to external loads operating at a high voltage. The multi-phase windings U, V, W and the multi-phase windings U', V', W' may generate power output at the same phase or in deviated phases.

With the present embodiment, the stator coil 24 of the first rotary electric machine section 2 has the same number of turns as that of or a larger number of turns than that of the stator coil 34 of the second rotary electric machine section 3. This allows the first rotary electric machine section 2 to play a role as a power generator for generating a high output voltage (of for instance 42V) and the second rotary electric machine section 3 to play a role as a power generator for generating a low output voltage (of for instance 12V). The first rotary electric machine section 2 supplies electric power to high voltage loads and the second rotary electric machine section 3 supplies electric power to low voltage loads. Moreover, with the present embodiment, the second rotary electric machine section 3 is arranged to supply electric power to important electrical loads (such as electrical loads in regular use), needed to be supplied with electric power at all times, which are designed to operate at a low voltage. In contrast, high-voltage loads are designed to play a role as nonpriority electrical loads, with no need to be supplied with electric power at all times, to which electric power is supplied from the first rotary electric machine section 2.

Now, the stator coils 24, 34 are described below in detail.

With the present embodiment, the stator coils 24, 34 take the forms of segments-sequentially-joined stator coil structures of known art. The segments-sequentially-joined stator coil structure includes a large number of U-shaped segment conductors whose one pair of leg portions (linear portions) are individually inserted in two slots, dislocated from each other by an electric angle ☐, in an axial direction from one side of the slots. Pairs of distal end portions of the U-shaped segment conductors, protruding from the slots, are sequentially connected in a wave winding method or a lap winding method. The segments-sequentially-joined stator coil structure is already well known by the patent literatures set forth above and, so, detailed description of the same is herein omitted.

While the embodiment has been described with reference to a structure wherein the respective slots of the stator coils 24, 34 have four conductor receiving positions along a radial direction with the number of slots allocated for each phase and each pole is selected to be "1", an even number of conductor receiving positions may be allocated in one slot in the radial direction. In an alternative, a plurality of slots may be allocated for each phase and each pole.

For instance, while the present embodiment may take the form of segments-sequentially-joined stator coils including two types of segments composed of a large segment, having both leg portions inserted to the radially innermost position and the radially outermost position of the slots, and a small segment having both leg portions inserted to the radially allocated second and third positions of the slots, the present invention is not limited to such a configuration and may take various segments-sequentially-joined stator coil structures of the related art.

With the segments-sequentially-joined stator coil structures employing the two kinds of segments set forth above, suppose the number of slots of the stator core 23 is N1 and the number of slots of the stator core 33 is N2, each of the phase windings U, V, W of the stator coil 24 has N1/3 pieces of small segments and N1/3 pieces of large segments. Each of the phase windings U, V, W of the stator coil 24 includes a small coil section composed of the N1/3 pieces of the sequentially connected small segments and a large coil section composed of the N1/3 pieces of the sequentially connected large segments.

Figure 4:
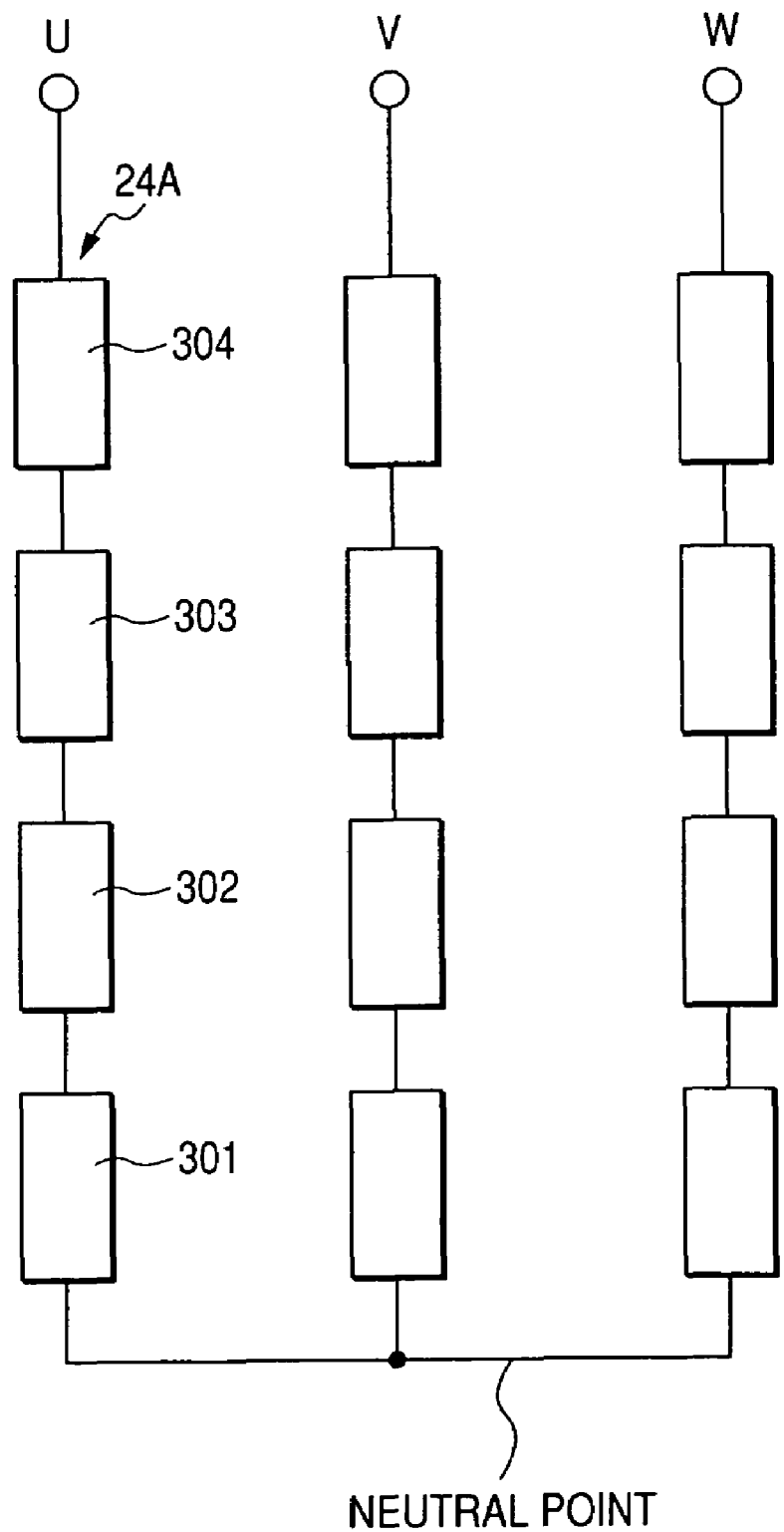
FIG. 4 is a circuit diagram of the segments-sequentially-joined stator coils shown in FIG. 2.
Figure 5:
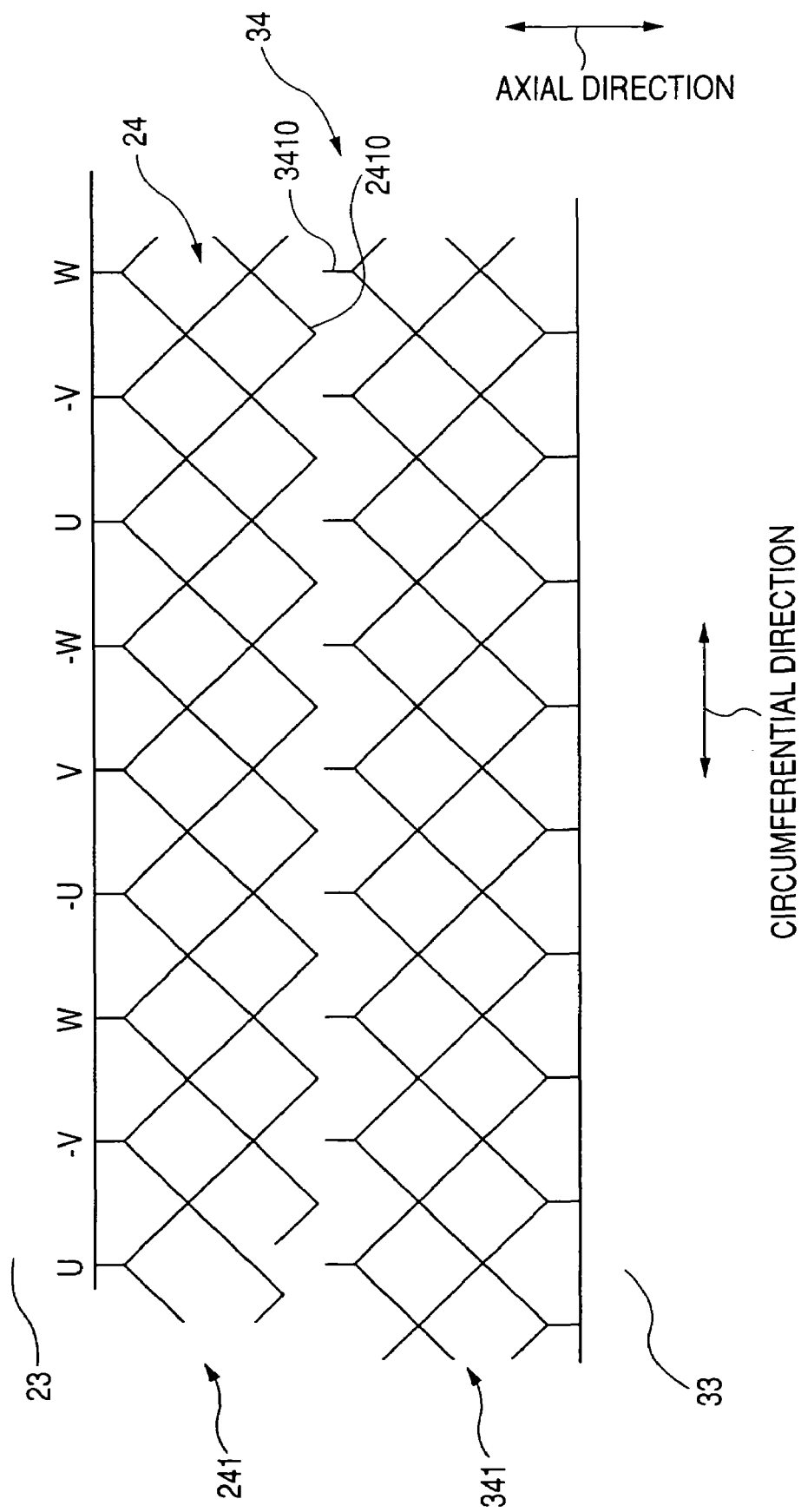
FIG. 5 is a layout diagram showing coil ends in an axial gap between the segments-sequentially-joined stator coils shown in FIG. 2.

Accordingly, each of the phase windings U, V, W of the stator coil 24, located in a position remote from the rectifiers 8, has the number of turns expressed as 2N1/3. With such an arrangement, a leading segment conductor and a trailing segment conductor of each of the phase windings U, V, W are not configured in U-shapes but in I-shapes. The leading I-shaped segment conductor plays a role as a pullout lead wire for each phase and the trailing I-shaped segment conductor is connected to a neutral point as shown in FIG. 4.

Likewise, each of the phase windings U', V', W' of the stator coil 34 can have N2/3 pieces of small segments and N2/3 pieces of large segments. Consequently, each of the phase windings U', V', W' of the stator coil 34 includes a small winding section, composed of a small coil section including N2/3 pieces of sequentially connected small segments and a large coil section including N2/3 pieces of sequentially connected large segments, which are connected in series in structure.

Accordingly, each of the phase windings U', V', W' of the stator coil 34, placed closer to the rectifiers 8, has the number of turns expressed as 2N2/3. With such an arrangement, a leading segment conductor and a trailing segment conductor of each of the phase windings U', V', W' are not configured in U-shapes but in I-shapes. The leading I-shaped segment conductor plays a role as a pullout lead wire for each phase and the trailing I-shaped segment conductor is connected to the neutral point as shown in FIG. 4.

As set forth above, the vehicular tandem type rotary electric machine of the present embodiment has the pair of stator coils 24, 34 both of which take the form of the segments-sequentially-joined stator coil structures, respectively. The use of such structures enables each pair of coil ends of the stator coils 24, 34 to be formed in shortened axial lengths. This results in capability of remarkably shortening an axial length of the vehicular tandem type rotary electric machine in contrast to the vehicular tandem type rotary electric machine of the related art with an increased axial length. Therefore, the vehicular tandem type rotary electric machine of the present embodiment can be minimized in size and weight, enabling a reduction in deflection and harmful vibrations of a rotary shaft.

Further, with the present embodiment, the use of the segments-sequentially-joined stator coil structures enables the vehicular tandem type rotary electric machine to be formed in the shortened axial length. This enables the second and third half cores 214, 313 to be axially held in abutting engagement with each other without causing an increase in axial space between the claw portions of the second and third half cores 214, 313. This makes it possible to prevent the formation of a cooling wind leakage path between the adjacent claw portions causing a cooling wind to flow in a circumferential direction of the rotor. Therefore, the rotational movements of the claw portions of the second half core 214 and the claw portions of the third half core 313 allow both of the claw portions to play roles as centrifugal blades to create airflows to be favorably blown out in centrifugal directions. This results in the capability of causing the airflows to efficiently cool the pair of coil ends in an axial air gap between the adjacent stator cores that would be hard to be cooled in the related art.

Also, with the structure shown in FIG. 1, the second half core 214 is selected to have the same total number of claw portions as that of the claw portions of the third half core 313 and both the claw portions assume the same circumferential positions. This enables the claw portions of the second half core 214 and the claw portions of the third half core 313, both of which are juxtaposed in an axial direction, to form a unitary centrifugal fin, enabling a centrifugal cooling wind to be generated in an efficient fashion.

With the present embodiment, furthermore, electric currents flow through the field coils 22, 32 in directions determined to allow the claw portions of the second and third half cores 214, 313 to have the same polarities. Such a structure enables a reduction in a cross-sectional surface area of a magnetic flux path causing the magnetic fluxes to pass through the claw portions of the second and third half cores 214, 313 and the boss portions of the second and third half cores 214, 313. This enables the realization of a rotor core in a compact structure. That is, an axial distance (width) between the claw portions of the second and third half cores, extending from the respective boss portions, can be reduced and a rotational mass and axial length of the rotor core can be reduced by that extent.

With the present embodiment, moreover, as understood from FIG. 1, the field coil 22 has an axial center position C2 that is dislocated from an axial center position C1 of the stator coil 23 to be closer to the second stator rotor pair 3 (in a rearward direction) and, similarly, the field coil 32 has an axial center position C3 that is dislocated from an axial center position C4 of the stator coil 33 to be closer to the second stator rotor pair 2 (in a forward direction). That is, the pair of rotor cores 21, 31 is placed in axially one-sided positions to be mutually close to each other. Such a structure enables a front end face of the rotor core 21 to be placed rearward and a rear end face of the rotor core 31 to be placed forward without causing a drop in the amount of field magnetic fluxes. This enables a front cooling fan 101, fixedly secured to the front end face of the rotor core 21, to be located radially inward of a front coil end 24a of the stator coil 24 on a front end thereof. Likewise, a rear cooling fan 102, fixedly secured to the rear end face of the rotor core 31, to be located radially inward of a rear coil end 34a of the stator coil 34 on a rear end thereof. This results in capability of efficiently cooling these coil ends 24a, 34a.

Second Embodiment

Figure 2:
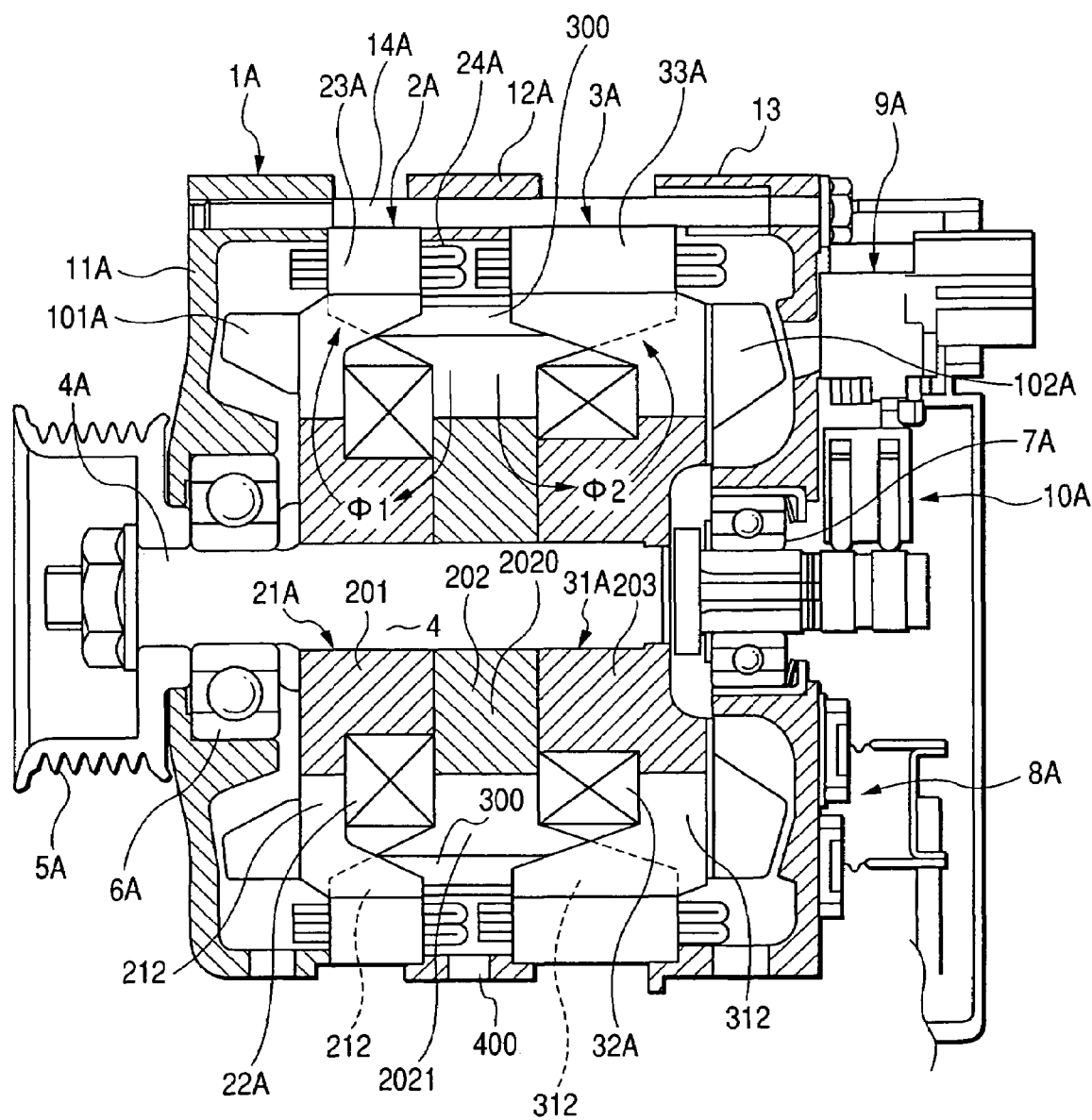
FIG. 2 is an axial sectional view of a vehicular Lundell type rotary electric machine of a second embodiment according to the present invention.

A vehicular tandem type rotary electric machine of a second embodiment according to the present invention is described with reference to FIG. 2 showing an overall structure of the rotary electric machine in a cross-sectional view. The vehicular tandem type rotary electric machine of the present embodiment has the same fundamental structure as that of the first embodiment and, so, description will be given with a focus on differing points.

With the present embodiment, a Lundell-type rotor core 21A of a first rotary electric machine section 2A is comprised of half cores 201, 202 and a Lundell-type rotor core 31A of a second rotary electric machine section 3A is comprised of half cores 202, 203. In particular, with the present embodiment, the Lundell-type rotor cores 21A, 31A are structured such that the half core 201 placed on a front side, the intermediate half core 202 and the half core 203 placed on a rear side are held in abutting engagement with each other in an axial direction. The half core 201 has the same configuration as that of the half core 213 shown in FIG. 1. Also, the half core 202 takes a unitary structure composed of the half cores 214, 313 shown in FIG. 1.

Consequently, the intermediate half core 202 includes a common boss portion 2020, carried on a rotary shaft 4A, and having an outer periphery formed with claw base portions (also referred to as pole portions) 2021, radially extending outward at equidistantly spaced positions along a circumferential periphery of the intermediate half core 202, and first and second claw portions 212, 312 alternately extending in opposite directions along an axis of the rotary shaft 4A. Such an arrangement enables a reduction in the number of component parts and a decrease in magnetic reluctance of a field magnetic flux path while achieving reduction in the magnitude of excitation current.

Further, the vehicular tandem type rotary electric machine of the present embodiment adopts two-layer type segments-sequentially-joined stator coil structures that allow segments-sequentially-joined stator coils, forming the stator coils 24A, 34A, to be accommodated in respective slots each in radially adjacent two conductor receiving positions.

Figure 3:
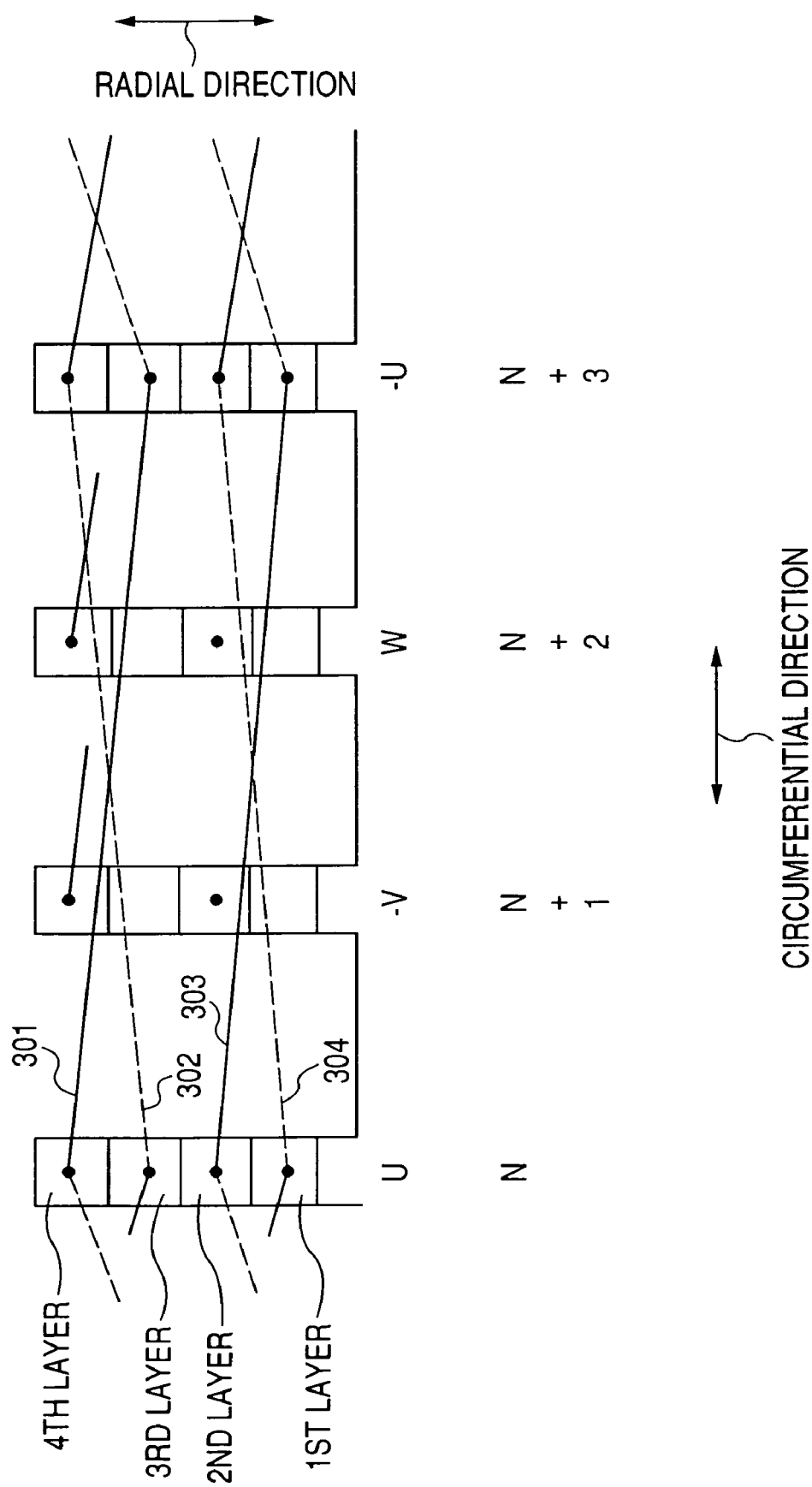
FIG. 3 is a pattern diagram of a conductor layout showing a part of segments-sequentially-joined stator coils shown in FIG. 2.

Next, the segments-sequentially-joined stator coil structures of the two-layer type are described below in detail with reference to FIG. 3. FIG. 3 is a development side view showing the stator core 23A in four slots representing Nth slot to N+3th slot. Each slot has four conductor receiving positions (hereinafter also referred to as layers) juxtaposed in a radial direction and each conductor receiving position receives one slot conductor portion. Also, the term "slot conductor portion" refers to an intermediate portion of a single leg forming a U-shaped segment conductor. The U-shaped segment conductor has the leg portions whose distal end portions protrude axially outward from the slots to form a coil end on a terminal portion side. A U-shaped head portion and base portions of associated leg portions of the U-shaped segment conductor form a coil end on a head portion side.

As shown in FIG. 3, the segment conductors, inserted to the conductor receiving positions in third and fourth layers of each slot, form two wave winding coils 301, 302 wound in wave winding patterns, respectively, and the segment conductors, inserted to the conductor receiving positions in first and second layers of each slot, form two wave winding coils 303, 304 wound in wave winding patterns, respectively. The wave winding coils 301 to 304 are connected in series to form a U-phase coil as shown in FIG. 4. Likewise, a V-phase coil and a W-phase coil are formed in a similar fashion. The U-phase coil, the V-phase coil and the W-phase coil are configured in a star connection to form the three-phase stator coil 24A. Since the three-phase stator coil 34A is similarly formed, a detailed description of the same is herein omitted.

With the present embodiment, stacking the two-layer type segments-sequentially-joined stator coils in the radial direction and serially connecting these stator coils allows each phase coil to be formed. This enables the minimization of axially protruding lengths of the coil ends. That is, the coil end of the segments-sequentially-joined stator coil of the first embodiment, shown in FIG. 1, has a demanded length that is added in an axial direction by at least a cross-sectional width of the large segment in an area axially outward of the small segment. In contrast, with the second embodiment, no overlapping takes place between the small segment and the large segment in such a coil end. Thus, the coil end can essentially have a shortened axial length with the resultant capability of further reduction in an axial length of the coil end of the segments-sequentially-joined stator coil to provide a particularly favorable effect on a vehicular tandem type rotary electric machine.

With the present embodiment, further, the coil end 241 of the stator coil 24 has a rear portion formed with an axially extreme protruding portion 2410 and the stator coil 34 of the coil end 341 has a front end formed with an axially extreme protruding portion 3410 that is arranged to assume a position deviated by substantially a half pitch in a circumferential direction. With the present embodiment, moreover, while the axially extreme protruding portion 2410 of the coil end 241 has a distal end of U-shaped head portion of the segment conductor and the axially extreme protruding portion 3410 of the coil end 341 has a welding portion at a leg end of the segment conductor, the present invention is not limited to such configurations. That is, with the present embodiment, by utilizing the axially distal ends of the coil ends of the segments-sequentially-joined stator coils arranged in repetitive convexo-concave patterns with a circumferentially fixed pitch, the two coil ends 241, 341 are axially adjacent to each other with an axial gap between the stator cores in alternative positions. This enables a clearance to be obtained between both the coil ends 241, 341, while making it possible to minimize the axial gap between both the stator cores 23, 33.

With the present embodiment, additionally, the claw portions 212, 312 of the intermediate half core 202, doubling as the second and third half cores 214, 313 of the first embodiment, extend in axially opposite directions at the same circumferential position. Thus, the claw portions 212, 312 of the intermediate half core 202 have no leakage of a cooling wind directed in the circumferential direction, enabling the cooling wind to be favorably generated in a centrifugal direction.

With the present embodiment, moreover, as shown in FIG. 6, a centrifugal fin 300, made of non-magnetic plate, axially extends and is connected between the claw portions 212, 312 of the half cores 201, 203 in a circumferentially intermediate position between the claw portions 212, 312 formed on one circumferentially given position of the claw base portion 2020 and the claw portions 212, 312 formed on the claw base portion 2020 at the other circumferentially given position deviated by a given circumferential pitch. The non-magnetic centrifugal fin 300 has both ends supported with distal ends of the claw portion 212 of the front half core 201 and a distal end of the claw portion 312 of the rear half core 203. This enables an increase in the number of centrifugal fins provided between the two rotor cores 21, 31, making it possible to remarkably improve a cooling effect on the pair of coil ends in the axial gap between the stator cores. In an alternative, the non-magnetic centrifugal fin 300 may be fixedly secured to the claw base portion 2020 of the half core 202.

Additionally, with the present embodiment, as shown in FIG. 6, the front cooling fan 101, fixedly secured to a front end face of the half core 201, is obliquely formed and the rear cooling fan 102, fixedly secured to a rear end face of the half core 203, is obliquely formed. With such arrangements, these cooling fans can have centrifugally oriented wind blow-off functions and axially oriented wind blow-off functions to blow off winds toward the non-magnetic centrifugal fins 300 in the axial direction. Thus, the pair of coil ends in the axial gap between the stator cores can be further favorably cooled. Also, the cooling wind cools the pair of coil ends in the axial gap between the stator cores and, subsequently, is discharged from an exhaust port 400 to the outside.

While the specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention, which is to be given the full breadth of the following claims and all equivalents thereof.

What is claimed is:

1. A vehicular tandem type rotary electric machine comprising first and second stator rotor pairs including Lundell-type rotor cores wound with field coils, and stator cores wound with stator coils, which are placed in areas radially outside the Lundell-type rotor cores, respectively; rectifiers placed in areas axially outside the second stator rotor pair and spaced from the first stator rotor pair for rectifying output voltages generated by the stator coils; and a controller independently controlling field currents of the stator rotor pairs, in which the two Lundell-type rotor cores are fixed on a common rotary shaft in an axially adjacent relationship and driven by an on-vehicle engine, wherein:

the stator coils of the first and second stator rotor include segments comprising sequentially-joined stator coil structures, respectively, in which segment conductors are inserted into slots of each stator core from one side in an axial direction and have ends that are sequentially connected to each other; and the field coil of the first stator rotor pair has an axial center position deviated from an axial center position of the first stator core to be closer to the second stator rotor pair, and the field coil of the second stator rotor pair has an axial center position deviated from an axial center position of the second stator core to be closer to the first stator rotor pair.

2. The vehicular tandem type rotary electric machine according to claim 1, wherein:

each of the stator coils has segments comprising sequentially-joined stator coil structures having coil portions disposed in each slot at two radially adjacent accommodating portions thereof.

3. The vehicular tandem type rotary electric machine according to claim 1, wherein:

the first stator rotor pair includes first and second half cores having boss portions, respectively, which are held in axially abutting engagement with each other and having claw portions with different magnetic polarities;

the second stator rotor pair includes third and fourth half cores having boss portions, respectively, which are held in axially abutting engagement with each other and having claw portions with different magnetic polarities; and the second and third half cores are axially held in tight contact with each other.

4. The vehicular tandem type rotary electric machine according to claim 3, wherein:

the second and third half cores are integrally formed with each other into a single piece of soft magnetic core member.

5. The vehicular tandem type rotary electric machine according to claim 3, wherein:

the claw portions of the second half core and the claw portions of the third half core extend radially outward from circumferential peripheries of the boss portions and further extend in axial directions at axially-aligned positions that are opposite to each other.

* * * * *